(12) United States Patent
Kwon et al.

(10) Patent No.: US 12,225,256 B2
(45) Date of Patent: Feb. 11, 2025

(54) DISPLAY DEVICE

(71) Applicant: LG ELECTRONICS INC., Seoul (KR)

(72) Inventors: Miyeon Kwon, Seoul (KR); Seongwoon Seol, Seoul (KR); Kyungryun Lee, Seoul (KR); Eunyoung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 17/757,767

(22) PCT Filed: Dec. 19, 2019

(86) PCT No.: PCT/KR2019/018069
§ 371 (c)(1),
(2) Date: Jun. 20, 2022

(87) PCT Pub. No.: WO2021/125389
PCT Pub. Date: Jun. 24, 2021

(65) Prior Publication Data
US 2023/0018885 A1    Jan. 19, 2023

(51) Int. Cl.
*H04N 21/422* (2011.01)
(52) U.S. Cl.
CPC . *H04N 21/42203* (2013.01); *H04N 21/42226* (2013.01)
(58) Field of Classification Search
CPC ....... H04N 21/42203; H04N 21/42226; H04N 21/43615; H04N 21/43635; H04N 21/42204; H04N 21/485; G06F 3/167; G06F 3/14; G08C 17/02; G08C 23/04; G09G 5/12
See application file for complete search history.

(56) References Cited

U.S. PATENT DOCUMENTS

| | | | |
|---|---|---|---|
| 11,138,976 B1* | 10/2021 | Bailey | G06F 3/167 |
| 2008/0225184 A1 | 9/2008 | Hardacker et al. | |
| 2014/0136205 A1 | 5/2014 | Jang et al. | |
| 2018/0070125 A1* | 3/2018 | Lee | G08C 17/00 |
| 2018/0270525 A1 | 9/2018 | Yu et al. | |

FOREIGN PATENT DOCUMENTS

| | | |
|---|---|---|
| KR | 1020090115599 | 11/2009 |
| KR | 1020130091508 | 8/2013 |
| KR | 1020140060040 | 5/2014 |

OTHER PUBLICATIONS

PCT International Application No. PCT/KR2019/018069, International Search Report dated Sep. 15, 2020, 2 pages.

(Continued)

*Primary Examiner* — Kunal Langhnoja
(74) *Attorney, Agent, or Firm* — LEE, HONG, DEGERMAN, KANG & WAIMEY

(57) ABSTRACT

A display device according to an embodiment of the present disclosure comprises: a display unit; a user input interface unit which receives a signal from a remote control device; and a control unit which receives a voice signal, and on the basis of data extracted from the voice signal, sets an external device connected to the display device as an object to be controlled by the remote control device.

13 Claims, 13 Drawing Sheets

(56) References Cited

OTHER PUBLICATIONS

Park, Jung-In, "An artificial intelligence remote control that makes your "Bangkok" vacation at home more enjoyable," Live LG, LG Electronics Social Magazine, Jul. 17, 2019, <URL: https://social.lge.co.kr/product/tv_quick_help2/>, 15 pages.
European Patent Office Application Serial No. 19956582.1, Search Report dated Aug. 14, 2023, 9 pages.
LG Australia, "How to set up the LG Magic Remote as a Universal Remote," XP93068878, https://youtube.com/watch?v=MKFgVJQwU5c, Dec. 2015.

* cited by examiner

FIG. 7
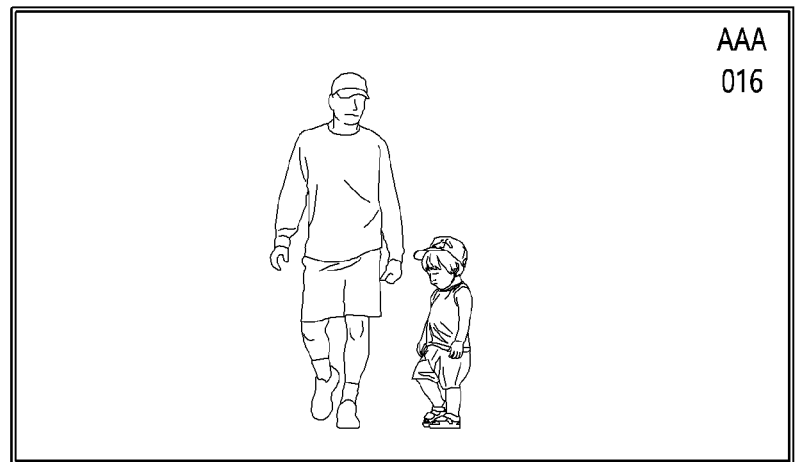
"Channel up"
(a)
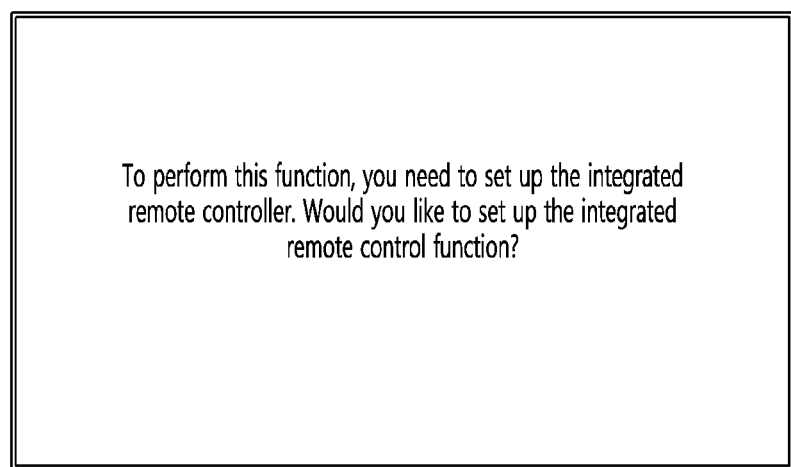
To perform this function, you need to set up the integrated remote controller. Would you like to set up the integrated remote control function?
(b)

FIG. 8
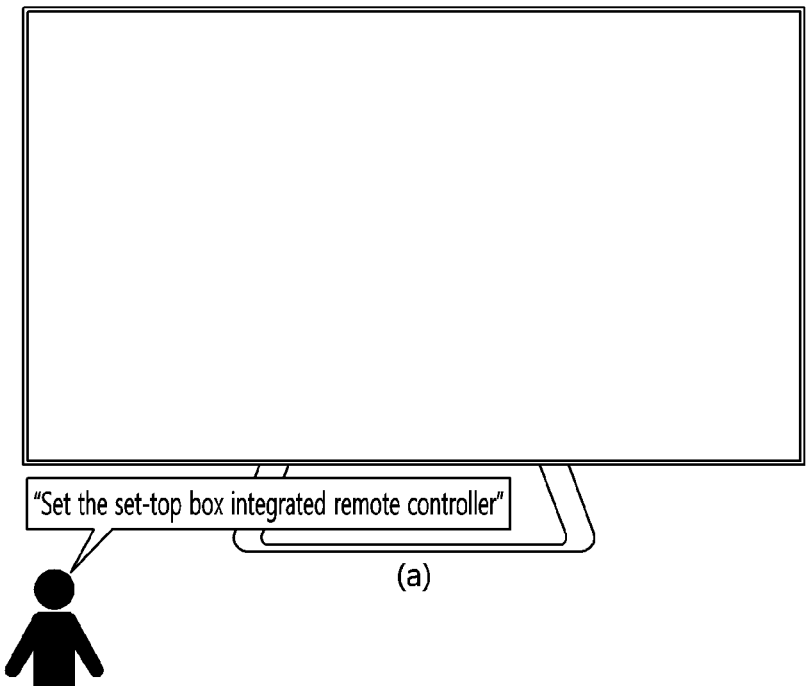
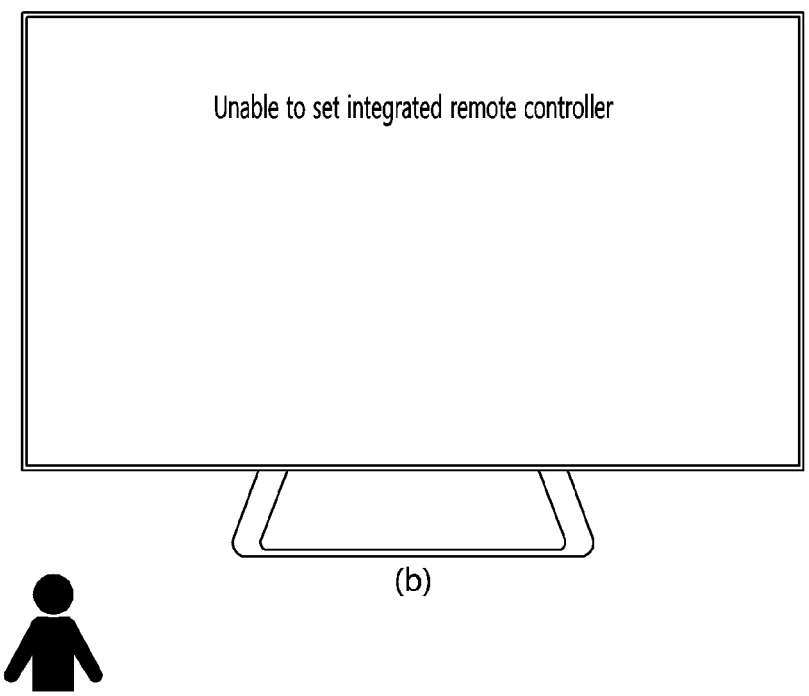

FIG. 9
"Connect set-top box"
(a)
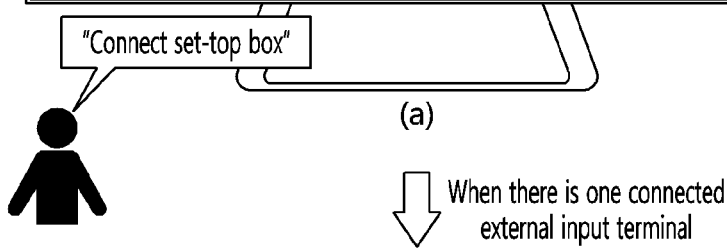
When there is one connected external input terminal
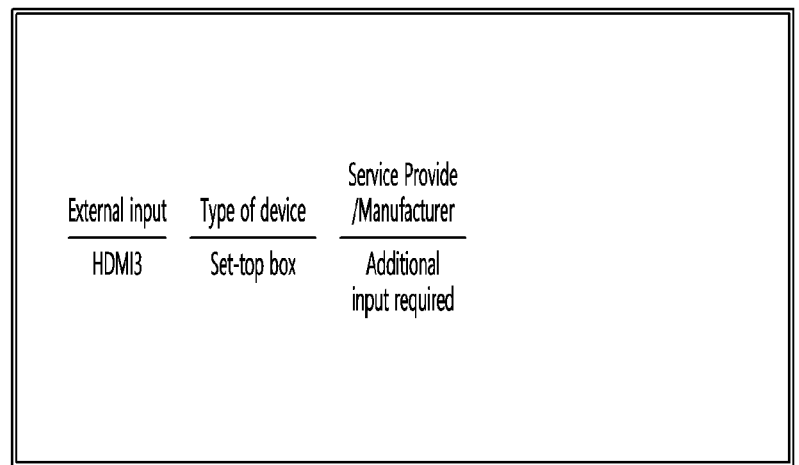
(b)

FIG. 10
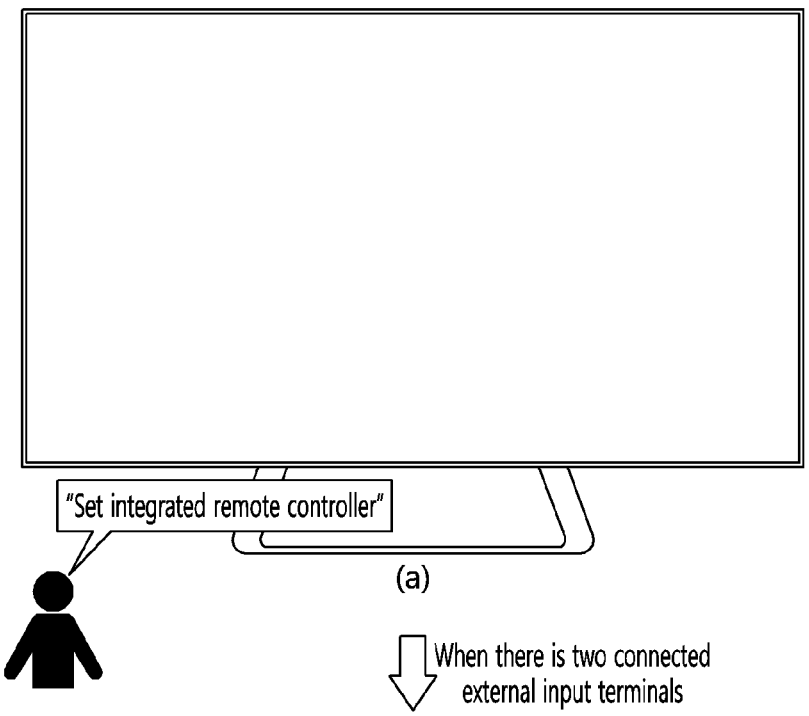
(a)
When there is two connected external input terminals
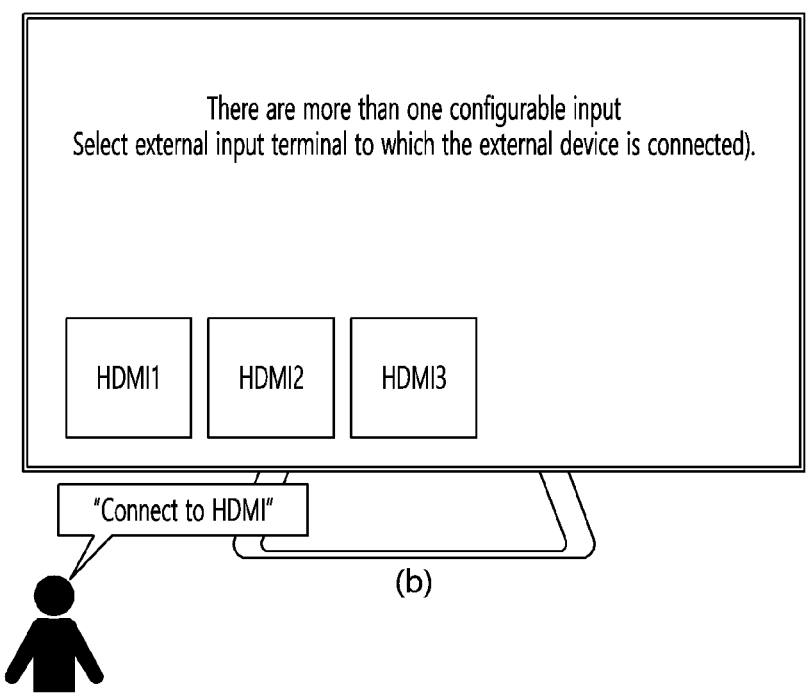
(b)

FIG. 11
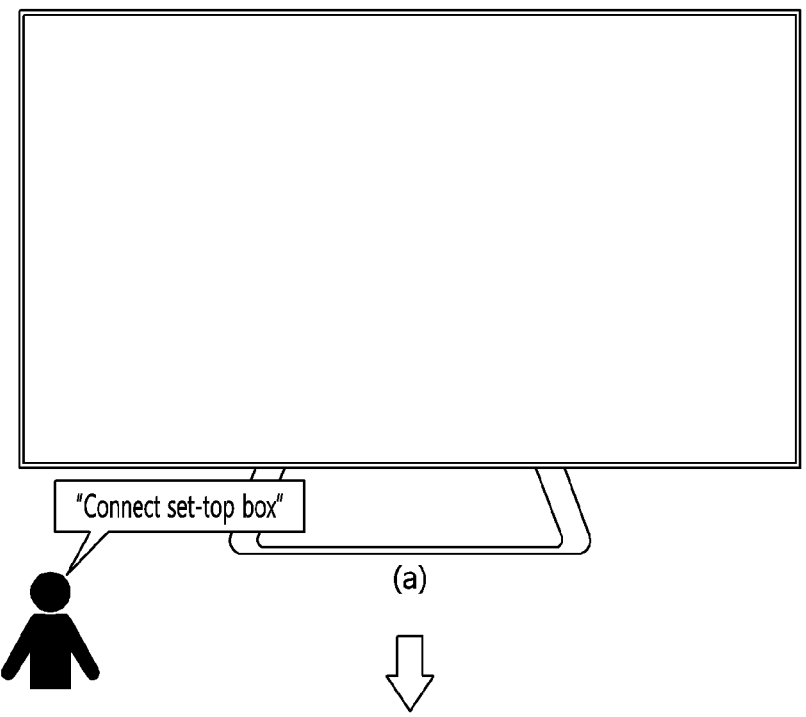
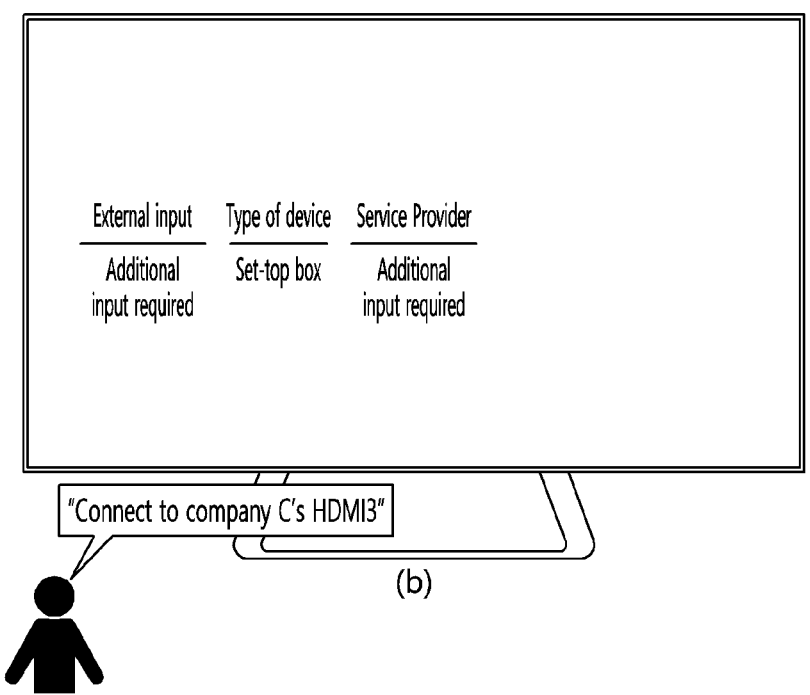

FIG. 12
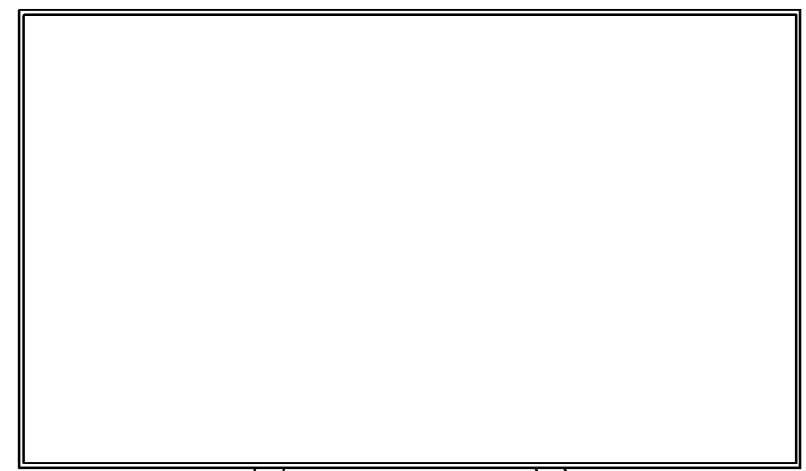
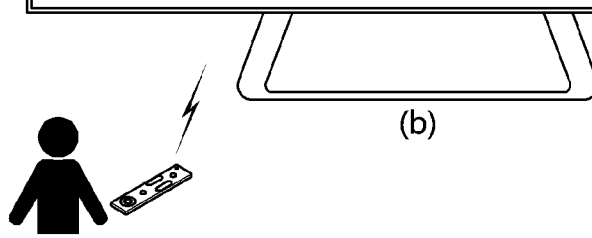
(a)
When there is one connected external input terminal
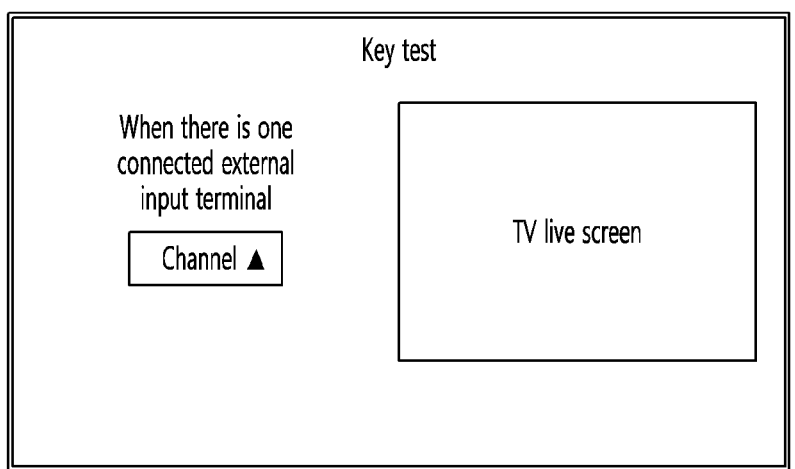
(b)

FIG. 13
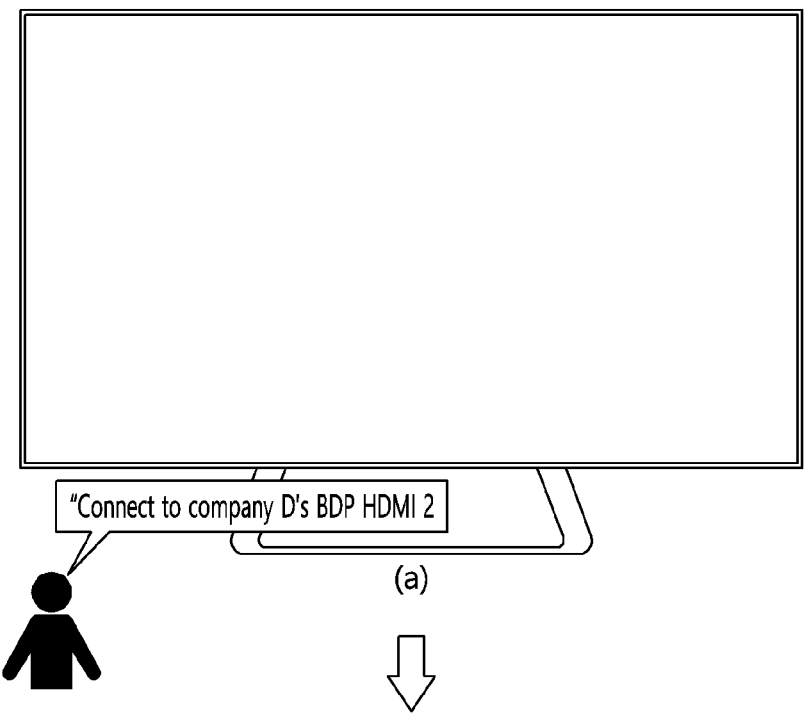
(a)
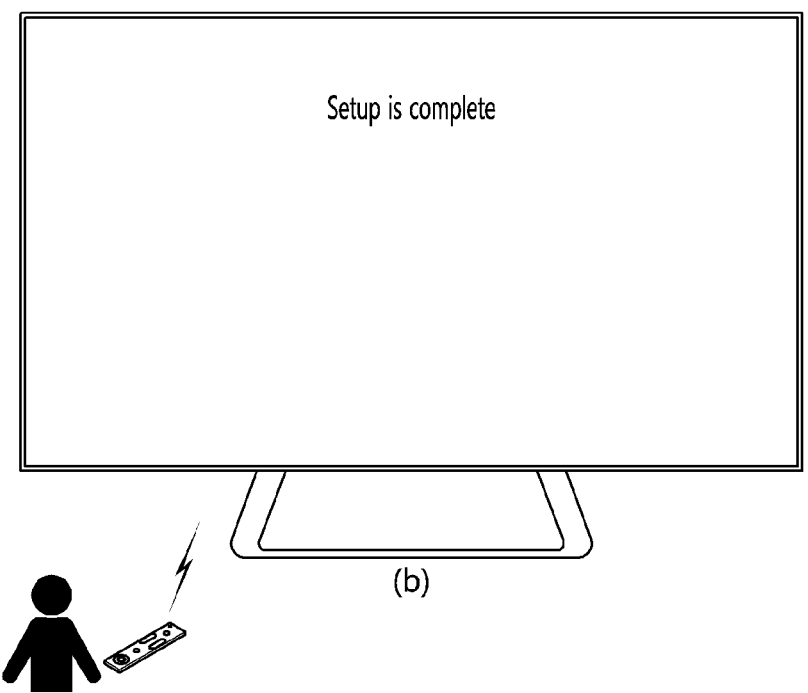
(b)

DISPLAY DEVICE

CROSS-REFERENCE TO RELATED APPLICATION(S)

This application is the National Stage filing under 35 U.S.C. 371 of International Application No. PCT/KR2019/018069, filed on Dec. 19, 2019, the contents of which are all incorporated by reference herein in its entirety.

TECHNICAL FIELD

The present disclosure relates to a display device. More particularly, the present disclosure relates to a method for setting an external device connected to a display device as a control target of a remote control device.

BACKGROUND ART

Recently, there is an increasing trend in the number of users who connect and use various external devices, such as a set-top box, a Bluetooth device, and a DVD player, to a display device. It may be very inconvenient when a user uses different remote controls for each external device to control each of the external devices connected to the display device. Thus, the display device may provide a function of setting an integrated remote controller.

The setting of the integrated remote controller may mean setting of an external device connected to the display device as a control target of the remote control device interlocked with the display device.

In the related art, a process of setting the integrated remote controller that controls the external device connected to the display device is too complicated, and thus, most users have difficulties. For example, the user has to enter a setting stage by finding a menu for setting an integrated remote controller on the display device, and even if the user enters the setting stage, a type of connected external device, an input terminal to which the external device is connected, and a manufacturer or service provider of the external device have to be directly input by the user through the remote control device to cause a lot of inconvenience.

DISCLOSURE OF THE INVENTION

Technical Problem

An object of the present disclosure is to provide a display device in which a process of setting an integrated remote controller is simplified.

An object of the present disclosure is to provide a display device capable of setting an integrated remote controller by receiving a minimum input.

An object of the present disclosure is to provide a display device that enables a user to easily and simply set a display device and an external device connected to the display device through voice utterance when it is set to be controlled by a single integrated remote controller.

Technical Solution

A display device according to an embodiment of the present disclosure includes a display, a user input interface configured to receive a signal from a remote control device, and a controller configured to receive a voice signal and set an external device connected to the display device as a control target of the remote control device based on data extracted from the voice signal.

When receiving a control command of the external device in a state in which a content of the external device that is not set as the control target of the remote control device is being displayed, the controller may be configured to perform an operation for setting the external device as the control target of the remote control device.

When receiving the control command of the external device in the state in which the content of the external device that is not set as the control target of the remote control device is being displayed, the display may be configured to display a screen that guides the setting of the external device as the control target of the remote control device.

When it is determined that the external device can be set as the control target of the remote control device based on the voice signal, the controller may be configured to extract the data and set the external device connected to the display device as the control target of the remote control device connected to the display device by using the data.

The controller may be configured to extract the data comprising at least one of a type of external device, a service provider of the external device, a manufacturer of the external device, or an external input terminal to which the external device is connected.

When receiving the voice signal for setting external device as the control target of the remote control device, the controller may be configured to acquire the number of external input terminals connected to the external device and receive a selection command of the external input terminal, to which the external device set as the control target of the remote control device is connected, when the external input terminal connected to the external device is provided in plurality.

When receiving the voice signal for setting external device as the control target of the remote control device, the controller may be configured to acquire the number of external input terminals connected to the external device, recognize the external input terminal, to which the external device is connected, when there is one external input terminal to which the external device is connected, and set the external device connected to the recognized external input terminal as the control target of the remote control device.

When receiving a command for setting the external device connected to the display device as the control target of the remote control device through the voice signal, the controller may be configured to acquire the number of external input terminals connected to the external device and receive a selection command of the external device to be set as the control target of the remote control device when the external device connected to the display device is provided in plurality.

When the data extracted from the voice signal comprises all data for setting the external device as the control target of the remote control device, the controller may be configured to set the external device connected to the display device as the control target of the remote control device based on the data extracted from the voice signal.

When the data extracted from the voice signal does not comprise all data for setting the external device as the control target of the remote control device, the controller may be configured to further receive an input signal of the data and set the external device connected to the display device as the control target of the remote control device.

The display may be configured to display types of data required for setting the external device as the control target of the remote control device.

The display may be configured to display data, which is not extracted from the voice signal among the data for setting the external device as the control target of the remote control device, as a type of required data.

The controller may be configured to receive an additional input signal of the data after displaying the type of required data through the display.

The controller may be configured to set the external device as the control target of the remote control device by using the data extracted from the voice signal and data depending on the additional input signal.

When it is determined that the external device connected to the display device is a device that requires a key test, the controller may be configured to output a key test screen through the display.

Advantageous Effects

According to the embodiment of the present disclosure, there may be the effect of increasing in user convenience by shortening the complicated process of setting the integrated remote controller.

According to the embodiment of the present disclosure, there may be the effect of allowing a user to facilitate entering into the process of setting the integrated remote controller through voice utterance.

According to the embodiment of the present disclosure, the display device may extract the data that is necessary for setting the integrated remote controller by itself to minimize the user's inconvenience, in which the data required for setting the integrated remote controller is input one by one, and simplify the process of setting the integrated remote controller.

BRIEF DESCRIPTION OF THE DRAWINGS

FIG. 7 is a view illustrating an example of a method for recognizing a control command of an external device as a command for setting an integrated remote controller through the display device according to an embodiment of the present disclosure.

FIG. 8 is a view illustrating an example of a method for determining that setting of an integrated remote controller is impossible for an external device through the display device according to an embodiment of the present disclosure.

FIG. 9 is a view illustrating an example of a method for extracting data necessary for setting the integrated remote controller depending on a connection state of the external device through the display device according to an embodiment of the present disclosure.

FIG. 10 is a view illustrating another example of the method for extracting the data necessary for setting the integrated remote controller depending on the connection state of the external device through the display device according to an embodiment of the present disclosure.

FIG. 11 is a view illustrating an example of a method for additionally receiving the data necessary for setting the integrated remote controller depending on the connection state of the external device through the display device according to an embodiment of the present disclosure.

FIG. 12 is a view for explaining an example of a method for performing a key test through the display device according to an embodiment of the present disclosure.

FIG. 13 is a view illustrating an example of a state in which setting of an integrated remote controller is completed depending on a voice signal of the display device according to an embodiment of the present disclosure.

MODE FOR CARRYING OUT THE INVENTION

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
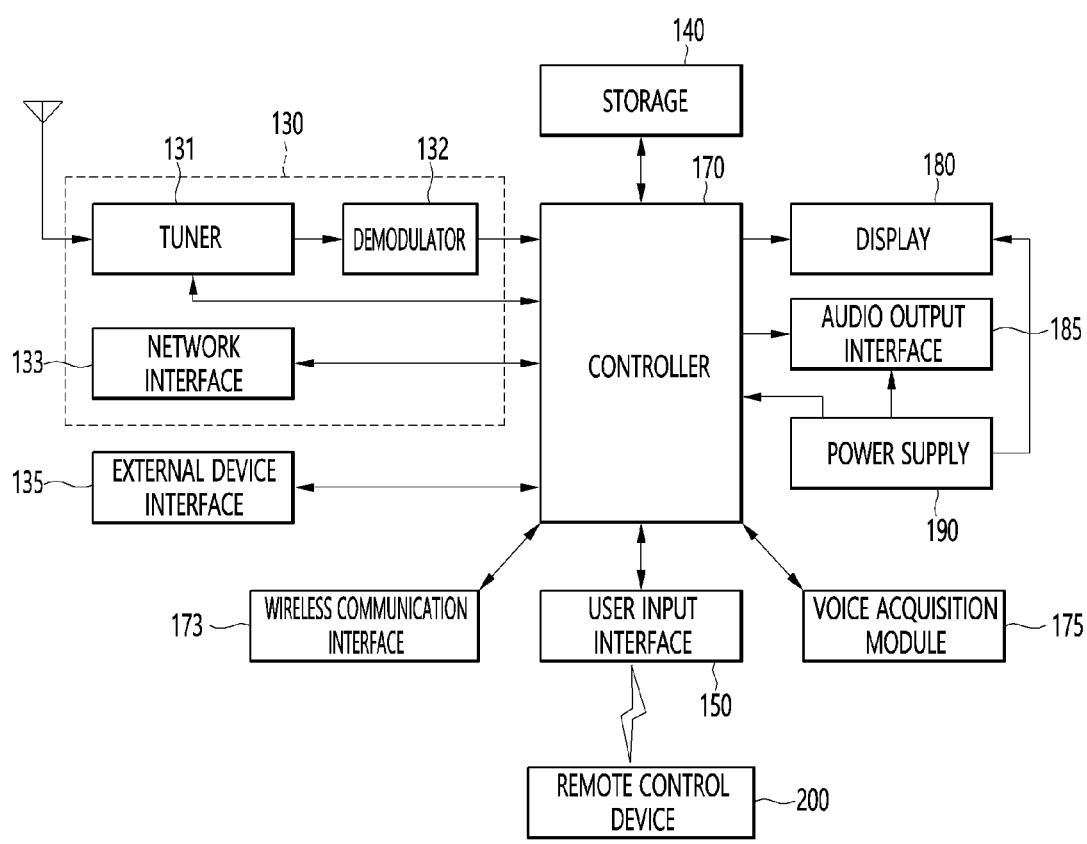
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
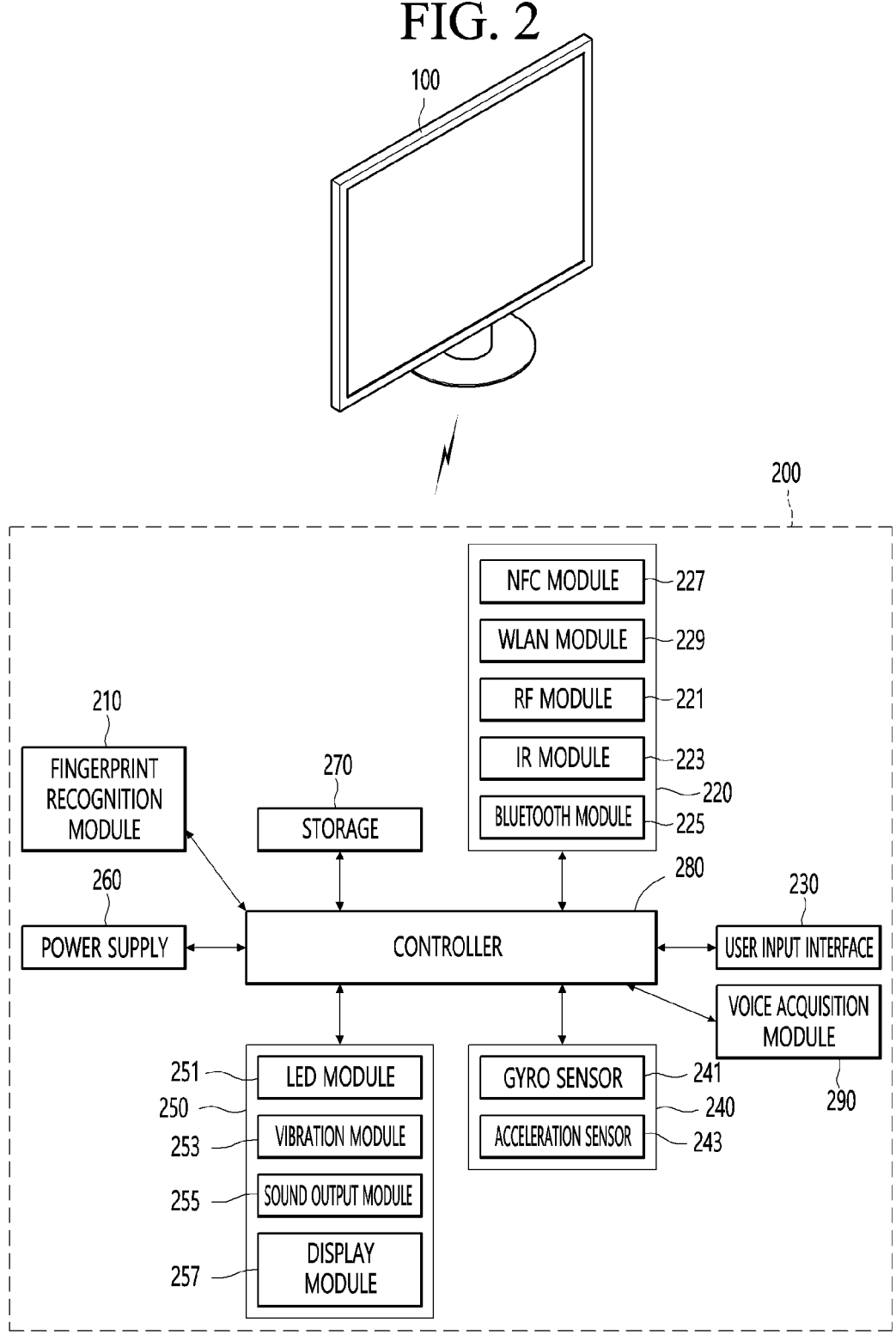
FIG. 2 is a block diagram illustrating a configuration of a display remote control device according to an embodiment of the present disclosure.
Figure 3:
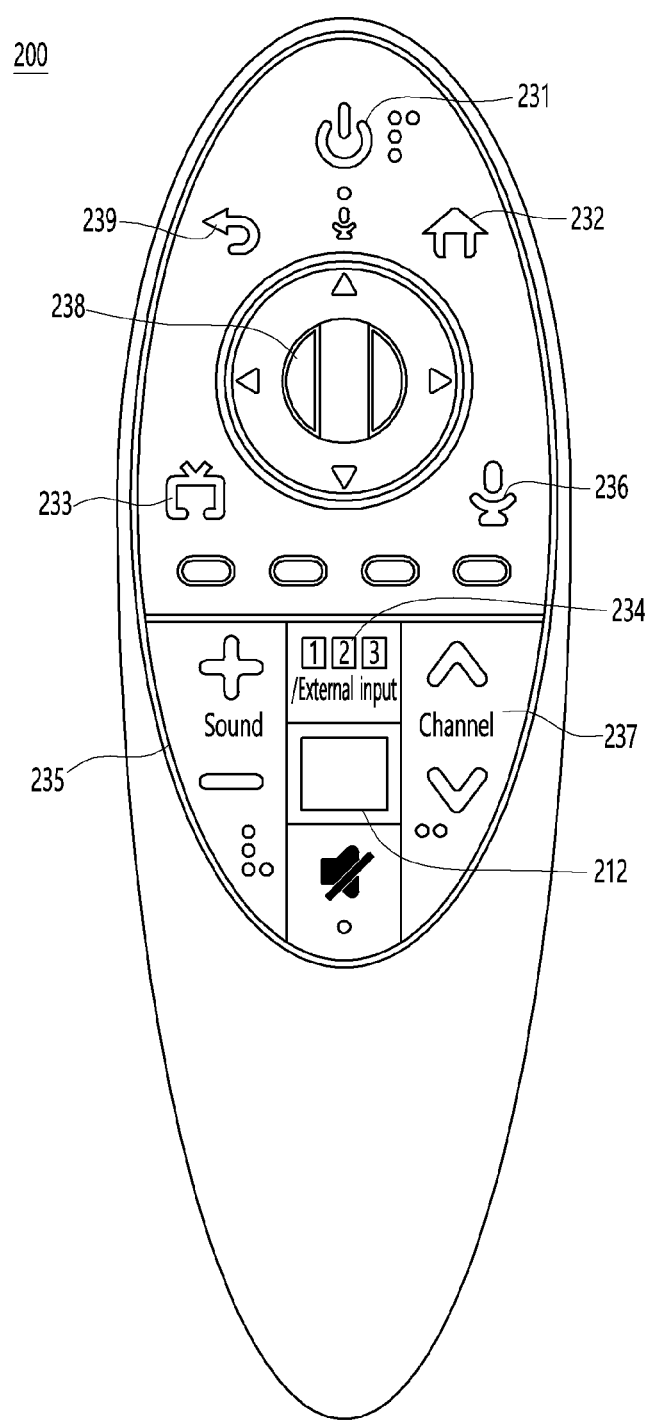
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
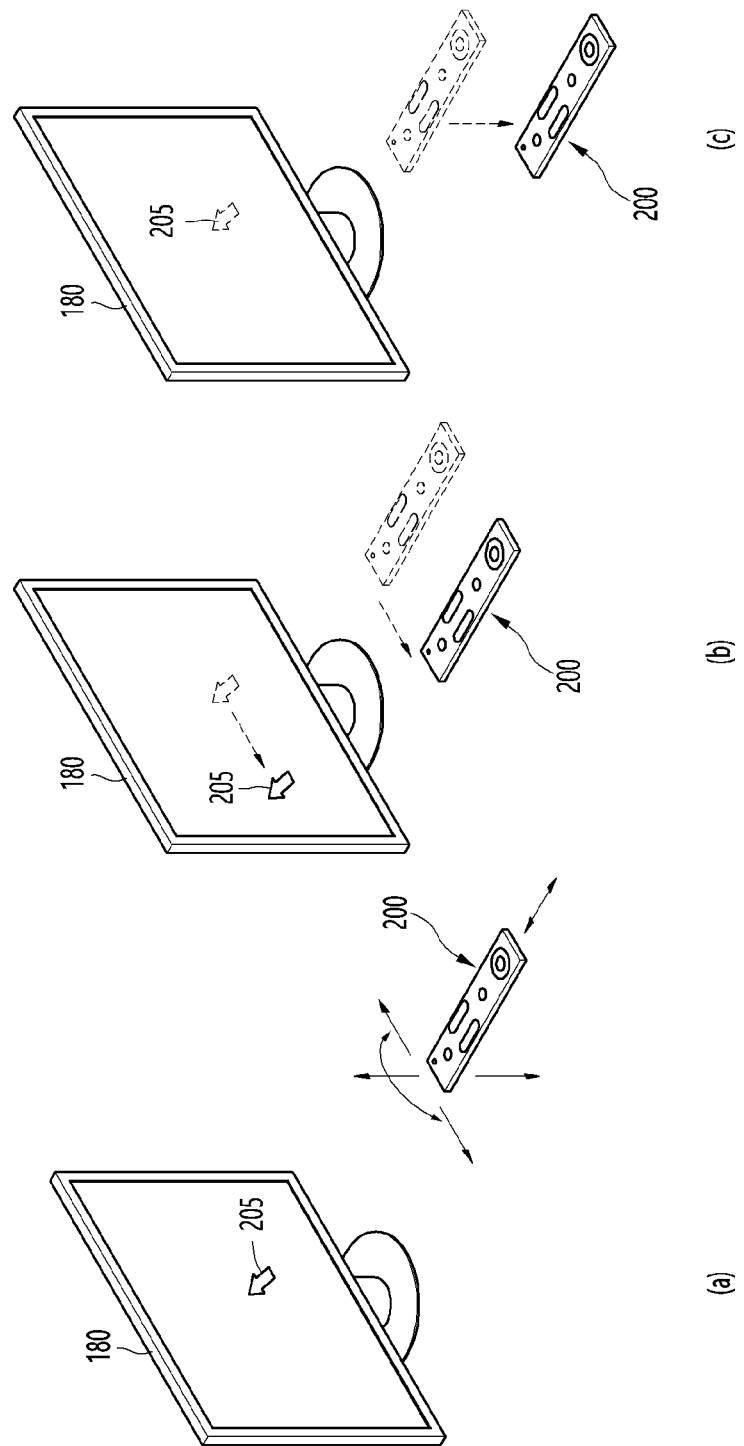
FIG. 4 is a view illustrating an example of a method for controlling an operation of a display device using the remote control device.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

In order to control various external devices connected to the display device 100, it may be very inconvenient when a user uses different remote controllers for each external device. Thus, the display device 100 may provide a function of setting an integrated remote controller.

The setting of the integrated remote controller may mean setting of an external device connected to the display device 100 as a control target of a remote control device 200 interlocked with the display device 100.

The display device 100 according to an embodiment of the present disclosure may set the external device as the control target of the remote control device 200 through voice utterance. Specifically, the controller 170 may set the external device connected to the display device 100 as the control target of the remote control device 200 based on data extracted from a voice signal, which will be described in detail below.

Figure 5:
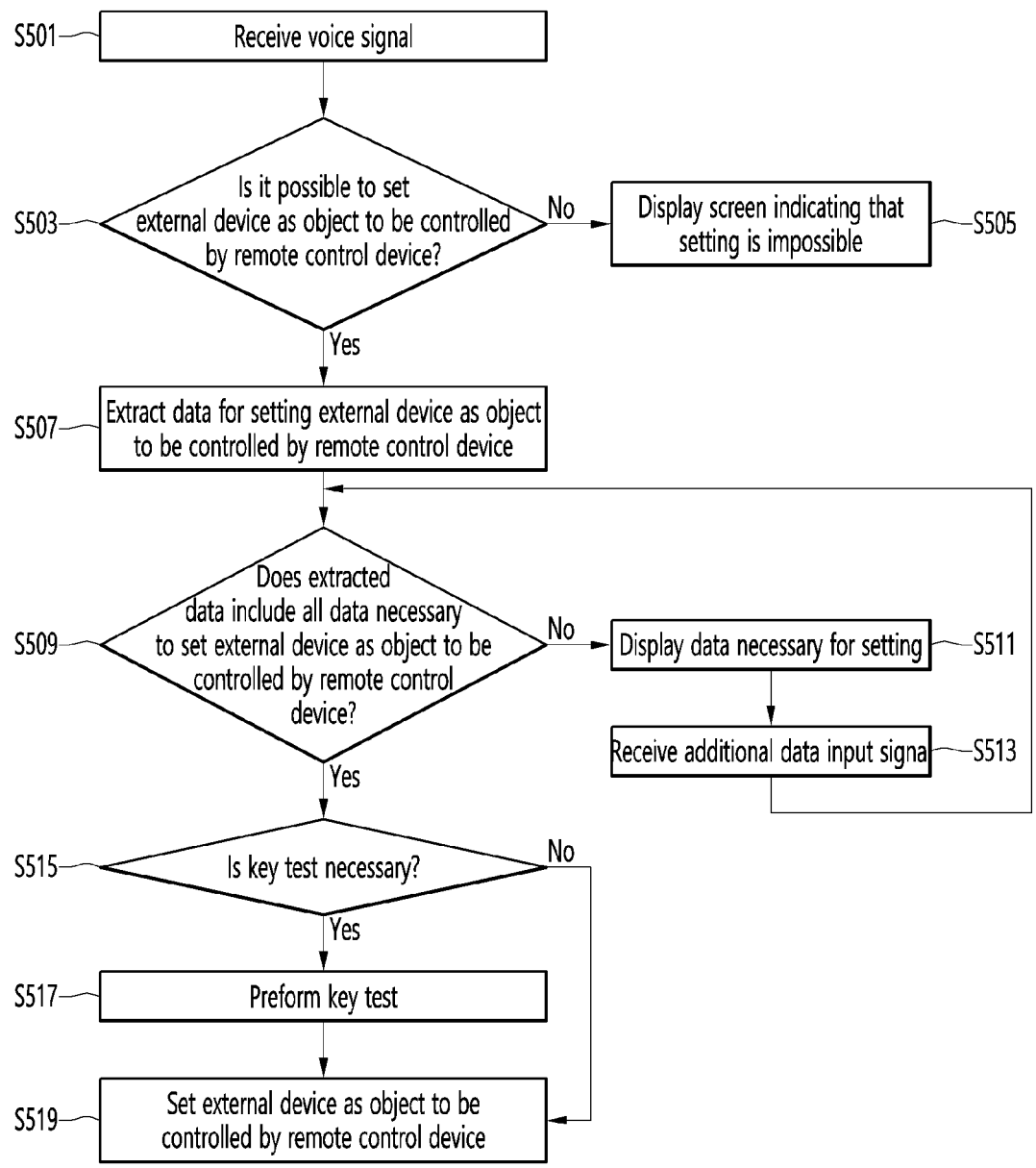
FIG. 5 is a flowchart for explaining a method for operating the display device according to an embodiment of the present disclosure.

Next, FIG. 5 is a flowchart for explaining an example of a method of operating the display device according to an embodiment of the present disclosure.

The controller 170 may receive a voice signal (S501).

The controller 170 may receive the voice signal from the voice acquisition module 175. Also, the controller 170 may receive the voice signal from the remote control device 200 through the user input interface 150.

The display device 100 may include an STT module 176 and an NLP module 177 to recognize the voice signal acquired in this manner.

Next, the STT module 176 and the NLP module 177, which are provided in the display device 100 according to an embodiment of the present disclosure, will be described with reference to FIG. 6.

Figure 6:
FIG. 6 is a schematic view illustrating an STT module and an NLP module, which are provided in the display device, according to an embodiment of the present disclosure.

FIG. 6 is a schematic view illustrating the STT module and the NLP module, which are provided in the display device, according to an embodiment of the present disclosure.

The display device 100 according to an embodiment of the present disclosure may further include an STT module 176 and an NLP module 177. The STT module 176 and the NLP module 177 may be included in the voice acquisition module 175 or may be included in the controller 170. Alternatively, the STT module 176 and the NLP module 177 may be provided as separate components of the display device 100.

The speech-to-text (STT) module 176 may interpret the voice signal to perform a process of converting the content into text data.

The natural language processing (NLP) module 177 may be utilized to provide more accurate information by allowing a computer to understand the user's intention.

For example, when the user utters "set the integrated remote controller", the controller 170 may acquire an audio uttered by the user through the voice acquisition module 175, convert the audio acquired through the STT module 176 into text data, and analyze the intension to start setting of the integrated remote controller based on the text data through the NLP module 177. That is, when acquiring the audio of "set the integrated remote controller", the controller 170 may recognize a command for setting the integrated remote controller through the STT module 176 and the NLP module 177.

A process of recognizing the grasped intention by interpreting the voice signal through the controller 170 may be performed through direct control by the controller 170 including the STT module 176 and the NLP module 177 therein and may be performed in various manners, such as being performed through a separate STT module 176 and a separate NLP module 177.

Next, a method for recognizing the voice signal as the command for setting the integrated remote controller through the STT module 176 and the NLP module 177 in the controller 170 will be described.

According to a first embodiment, when the controller 170 acquires the voice signal having the intension of setting an external device to a control target of the remote control device 200, such as the voice signal such as "set the integrated remote controller.", "set the remote controller.", "connect the set-top box.", the controller 170 may recognize the voice signal as a command to start an operation of setting the integrated remote controller.

According to a second embodiment, even when the controller 170 acquires the voice signal having the intension of controlling the external device in a state in which a content of the external device, which is not set as the control target of the remote control device 200 is displayed, the controller 170 may recognize the voice signal as the command to start the operation of setting the integrated remote controller and perform an operation for setting the external device as the control target of the remote control device 200. In this case, the controller 170 may display a screen for guiding the setting of the external device as the control target of the remote control device through the display 180.

Here, the voice signal intended to control the external device may include a command that is executed only when the external device is set as the control target of the remote control device 200, such as "Channel up", "Volume down.", and the like.

Next, a method for recognizing a control command of the external device that is not set as the control target as the command for setting the integrated remote controller through the controller 170 will be described with reference to FIG. 7.

The control command of the external device may include the voice signal having the intension of controlling the external device.

FIG. 7 is a view illustrating an example of a method for recognizing the control command of the external device as the command for setting the integrated remote controller through the display device according to an embodiment of the present disclosure.

First, (a) of FIG. 7 illustrates an example, in which the controller 170 receives the control command of "Channel up" in a state in which the content of the external device that is not set as the control target of the remote control device 200 is displayed. Here, the controller 170 may determine whether the external device that transmits the content being displayed to the display device 100 is an external device that is not set as the control target of the remote control device 200 and may recognize the control command "Channel up" as the command for setting the integrated remote controller when the external device that transmits the content being displayed to the display device 100 is the external device that is not set as the control target of the remote control device 200. In this case, the controller 170 may perform an operation for setting the external device as the control target of the remote control device 200.

Thus, as illustrated in (b) of FIG. 7, the controller 170 may display a screen for guiding the settings as the control target of the remote control device through the display 180.

FIG. 5 will be described again.

The controller 170 may determine whether the external device is set as the control target of the remote control device 200 (S503).

When the controller 170 may recognize that the voice signal is the command to start the operation of setting the external device as the control target of the remote control device 200, the controller 170 may determine whether the external device is set as the control target of the remote control device 200.

For example, when the voice signal is the command signal for setting the external device as the control target of the remote control device 200, such as "Set integrated remote controller." "Set remote controller." "Connect set-top box." or is the control command signal of the external device, such as "Channel up" in the state in which the content of the external device that is not set as the control target of the remote control device 200 is being displayed, the controller 170 may recognize the above-described voice signal as the command to start the setting of the integrated remote controller and determine whether the external device is set as the control target of the remote control device 200.

According to an embodiment, when an external input terminal to which the external device is connected exists in the display device 100, and the setting of the external device connected to the display device 100 as the control target of the remote control device 200 is not completed, the controller 170 may determine that the external device is capable of being set as the control target of the remote control device 200. When it is determined that the external device can be set as the control target of the remote control device 200, the controller 170 may perform the operation for setting the connected external device as the control target of the remote control device 200.

Conversely, when the external input terminal connected to the display device 100 does not exist, or all of the external devices connected to the display device 100 are set as the control targets of the remote control device 200, the controller 170 may determine that the external device is impossible to be set as the control target of the remote control device 200.

When it is not possible to set the external device as the control target of the remote control device 200, the controller 170 may display a screen indicating that the setting is impossible through the display 180 (S505).

Next, when the display device 100 is impossible to be set as the integrated remote controller, a method of displaying this state will be described with reference to FIG. 8.

FIG. 8 is a view illustrating an example of a method for determining that setting of the integrated remote controller is impossible for the external device through the display device according to an embodiment of the present disclosure.

First, referring to (a) of FIG. 8, the controller 170 may receive the voice signal such as "set set-top box integrated remote controller" and determine whether the external device is set as the control target of the remote control device 200. When the setting of the integrated remote controller of the set-top box is already completed, the controller 170 may determine that the setting of the integrated remote controller is impossible. At this time, as illustrated in (b) of FIG. 8, the controller 170 may display a screen indicating that the setting is impossible through the display 180.

FIG. 5 will be described again.

When it is determined that the external device can be set as the control target of the remote control device 200, the controller 170 may perform the operation for setting the connected external device as the control target of the remote control device 200.

Specifically, when the external device is set as the control target of the remote control device 200, the controller 170 may extract data for setting the external device as the control target of the remote control device 200 from the voice signal (S507).

The data for setting the external device as the control target of the remote control device 200 may mean data required for the controller 170 to control the external device through manipulation of the remote control device 200 interlocked with the display device 100.

For example, the data for setting the external device as the control target of the remote control device 200 may include at least one of a type of the external device, a service provider of the external device, a manufacturer of the external device, or an external input terminal to which the external device is connected.

The type of external device may be a set-top box, a Blu-ray player, a DVD player, a game console, a sound bar, a smartphone, a PC, an OTT, and an HTS. This is merely an example, and the type of external device includes all of the external devices that are connected to the display device.

In addition, the service provider of the external device means the name of a company that provides the service of the external device.

The manufacturer of the external device means the name of a company that manufactures the external device.

The external input terminal may include an RGB terminal, a high definition multimedia interface (HDMI) terminal, and a component terminal.

This is merely an example, and the data for setting the external device as the control target of the remote control device 200 may vary depending on the case.

According to an embodiment, a data extraction process (S507) for setting the external device as the control target of the remote control device 200 may be performed before operation S503. That is, according to an embodiment, an order of processes S503 and S507 may be changed.

For example, when the voice signal is "Set sound bar of Company B", the controller 170 may extract data, in which the type of external device is "sound bar", and that the manufacturer is "Company B".

In addition, the controller 170 may additionally extract data that is necessary for setting the integrated remote controller based on the data extracted from the voice signal.

For example, it is determined whether the external device is a device requires a key test, based on the controller 170 may extract data, in which the type of external device is "sound bar", and that the manufacturer is "Company B" when the voice signal is "Set sound bar of Company B".

In another embodiment, even when the voice signal is the control command signal of the external device during the displaying of the content of the external device that is not set as the control target of the remote control device 200, data for setting the external device as the control target of the remote control device 200 may be extracted from the voice signal.

For example, when the controller 170 receives the control command "Channel up company A" in a state in which the content of the external device that is not set as the control target of the remote control device 200 is being displayed, the controller 170 may determine that the type of the connected external device is the set-top box in that the voice signal is the channel control command, and the service provider of the set-top box may extract the data "Company A" from the voice signal.

According to another embodiment of the present disclosure, the controller 170 may extract data required for setting the integrated remote controller using connection information of the external device as well as extracting the data from the voice signal.

The controller 170 may acquire the connection information of the external device through the external device interface 135. Hereinafter, a method in which the controller 170 extracts the data necessary for setting the integrated remote controller using the connection information of the external device will be described in detail.

In an embodiment of the present disclosure, when the controller 170 receives the voice signal for setting the external device as the control target of the remote control device 200, the controller 170 may acquire the number of external input terminals to which the external devices are connected, recognize the external input terminal to which the external device is connected when there is only one external input terminal to which the external device is connected, and set the external device connected to the recognized external input terminal as the control target of the remote control device 200. In this case, the controller 170 may control the display 180 to display the recognized external input terminal.

Next, with reference to FIG. 9, when there is only one external input terminal to which the controller 170 is connected to the external device, a method for extracting the data necessary for setting the integrated remote controller will be described.

FIG. 9 is a view illustrating an example of a method for extracting that data necessary for setting the integrated remote controller depending on a connection state of the external device through the display device according to an embodiment of the present disclosure.

First, referring to (a) of FIG. 9, in a state in which the external device is connected to only an external input terminal HDMI3 of the display device 100, when the user utters "Connect set-top box", the controller 170 may acquire the number of external input terminals to which the external device is connected by using the external device interface 135 while extracting that data that the type of the external device is "set-top box" from the voice signal. Also, there is one external input terminal to which the external device is connected, and the external input terminal "HDMI3" may be extracted. Also, referring to (b) of FIG. 9, the controller 170 may control the display 180 to display the "set-top box" and "HDMI3" that are data.

In another embodiment of the present disclosure, when there are a plurality of external devices connected to the display device 100, the controller 170 may receive a command to select the external device In this case, the selection command of the external device may be a selection command of the external input terminal or a type selection command of the external device.

Next, a method in which the display device receives the selection command of the external input terminal according to an embodiment of the present disclosure will be described with reference to FIG. 10.

FIG. 10 is a view illustrating another example of the method for extracting the data necessary for setting the integrated remote controller depending on the connection state of the external device through the display device according to an embodiment of the present disclosure.

First, referring to (a) of FIG. 10, when the user utters "set integrated remote controller", the controller 170 may acquire the number of external input terminals, to which the external device is connected, by using the external device interface 135 and recognize that the external input terminal, to which the external device is connected, is provided in plurality. Therefore, as illustrated in (b) of FIG. 10, the controller 170 may display a screen requesting the command for selecting the external input terminal, to which an external device to be set as the control target of the remote control device 200 is connected, through the display 180 and may receive a selection signal from the user.

Unlike illustrated in (b) of FIG. 10, the display 180 may display the types of external devices and receive the electrode command of the external device through the command for selecting the external device to be set as the control target of the remote control device 200 among the types of the displayed external devices. That is, the controller 170 may receive the command for selecting the external device to be set as the control target of the remote control device 200 through the command for selecting the type of the external device.

Through the above-described embodiments, the controller 170 may acquire an effect of not only extracting the data from the voice signal, but also acquiring the data necessary for setting the integrated remote controller by using the connection information of the external device.

FIG. 5 will be described again.

The controller 170 may determine whether all of the data necessary for setting the external device as the control target of the remote control device 200 are included based on the data extracted from the voice signal (S509).

The controller 170 may compare the data extracted from the voice signal to the necessary data, and when the extracted data includes all of the data for setting the external device as the control target of the remote control device 200, the external device connected to the display device 100 may be set as the control target of the remote control device 200 based on the data extracted from the voice signal.

Also, the controller 170 may compare the extracted data to the necessary data, and if the extracted data does not include at least one of the necessary data, it may be determined that the integrated remote controller is not set.

The necessary data may be data for setting the external device as the control target of the remote control device 200.

For example, when the user utters "Connect set-top box", the controller 170 may extract data indicating that "type of external device" corresponds to "set-top box" through the voice signal. In this case, the controller 170 may determine as not including "external input terminal information" and "service provider information" among "external device type", "external input terminal information", and "service provider information" in which the extracted data is the data required to set the integrated remote controller. Thus, the controller 170 may determine that the integrated remote controller is not set because the extracted data does not include at least one of the necessary data.

When the extracted data does not include at least one of the data necessary to set the external device as the control target of the remote control device 200, the controller 170 may display the necessary setting data (S511). Also, the controller 170 may receive an additional input signal of the necessary data (S513).

When the extracted data does not include at least one of the data necessary to set the external device as the control target of the remote control device 200, the controller 170 may further receive an input signal of data and then set the external device connected to the display device 100 as the control target of the remote control device 200.

In this case, the controller 180 may display the type of data required to set the external device as the control target of the remote control device 200 through the display 180 and set the external device as the control target of the remote control device 200 and display data that is not extracted from the voice signal among the data for setting the external device as the control target of the remote control device 200 as a required data type.

For example, if the controller 170 determines that the data additionally required to set the external device as the control target of the remote control device 200 is "external input terminal information" and "service provider information", the controller 170 displays all of "external input terminal information", "service provider information" and "external device type", which are data necessary for setting the integrated remote controller and receive an input signal for that data additionally required by the user.

In addition, the controller 170 may display only "external input terminal information" and "service provider information" that are data that are not extracted from the voice signal among "external input terminal information" and "service provider information" and "type of external device", which are the data required for setting the integrated remote controller and receive an additional input signal from the user.

Next, with reference to FIG. 11, a method for additionally receiving the data required for setting the integrated remote controller by the display device 100 according to an embodiment of the present disclosure will be described.

FIG. 11 is a view illustrating an example of a method for additionally receiving the data necessary for setting the integrated remote controller depending on the connection state of the external device through the display device 100 according to an embodiment of the present disclosure.

First, referring to (a) of FIG. 11, when the user utters "Connect set-top box", the controller 170 may extract data indicating that the type of the connected device corresponds to "set-top box" through the voice signal, and determine that the data additionally required for setting the integrated remote controller is "external input terminal information" and "service provider information". Therefore, as illustrated in (b) of FIG. 11, the controller 170 may display "external input terminal" and "service provider" that are necessary data. Also, the controller 170 may receive an additional input signal of the necessary data.

That is, the user may more easily confirm the additionally required information through the screen as illustrated in (b) of FIG. 11, and thus, the additional necessary data may be easily input to the display device 100.

According to an embodiment of the present disclosure, the controller 170 may set the external device as the control target of the remote control device 200 by using the data extracted from the voice signal and data according to the additional input signal.

According to this embodiment, the user may easily determine additional information required for setting the integrated remote controller and may directly input only the data required for setting through voice communication or key manipulation of the remote control device 200.

Again, returning to FIG. 5, when the controller 170 determines that the extracted data includes all the data for setting the external device as the control target of the remote control device, the controller 170 may determine whether the connected external device is a device that requires the key test (S515).

The controller 170 may determine whether the external device requires the key test based on the data extracted through the voice signal.

For example, when the controller 170 immediately knows what control information the remote control device 200 uses to control the external device based on the extracted data, the controller 170 may determine the external device as the device that does not require the key test.

A case in which the controller 170 immediately knows what control information is used to control the external device with the remote control device 200 may mean a case in which one control information of the external device is specified through the manufacturer of the external device and/or the type of the external device.

Conversely, when the controller 170 does not immediately know what control information is used to control the external device based on the extracted external device data, the controller 170 may determine that the external device is a device that requires the key test to determine the key test.

When it is determined that the connected external device is a device requiring the key test, the controller 170 may execute the key test (S517).

The key test may mean a process of installing corresponding control information in the remote control device 200 so that the controller 170 acquires the control information necessary for controlling the external device through the remote control device 200 and allows the user to control the corresponding external device using the remote control device 200.

The control information may include, for example, codeset information. The codeset information may be information for controlling the external device and may include channel-related information, volume-related information, power-related information, menu-related information, setting-related information, and the like. The codeset information may be different for each model of the external device.

The controller 170 may perform the key test using the codeset information.

For example, the controller 170 may transmit a first control signal to the external device via the remote control device 200 using the first control information corresponding to the external device. When there is no change in operation corresponding to the transmission of the first control signal, the controller 170 may determine that it has failed to set the remote control device 200 to control the external device using the first control information and perform the key test using the next control information, for example, second control information. When there is a change in operation corresponding to the transmission of the second control signal, the controller 170 may set the remote control device 200 to control the external device through the second control information.

The above-described method for performing the key test is merely an example, and the controller 170 may perform a process of acquiring the control information of the external device, which is a target for setting the integrated remote controller, in various manners.

In addition, the key test may be performed by directly manipulating a key of the remote control device 200 by the user or may be performed through the voice utterance of the user by using the voice acquisition module 290 of the remote control device 200. Also, the controller 170 may directly transmit the control signal to the external device through the external device interface 135.

Also, the controller 170 may display a key test execution screen through the display 180.

Next, a method of performing the key test by the display device 100 according to an embodiment of the present disclosure will be described with reference to FIG. 12.

FIG. 12 is a view for explaining an example of a method for performing the key test through the display device according to an embodiment of the present disclosure.

First, referring to (a) of FIG. 12, the controller 170 may extract that the type of external device connected in the voice signal "Connect to company B's set-top box" is "set-top box" and the service provider is "Company B" and extract information of the external input terminal connected through the external device interface 135. As a result, the controller 170 may compare the extracted data to the necessary data to determine that the extracted data includes all of the data required for setting the integrated remote controller.

In addition, when it is determined that the connected external device is a device requiring the key test, the controller 170 may display a key test screen through the display 180 as illustrated in (b) of FIG. 12.

When the user performs an operation command displayed on the screen, if there is a change in operation corresponding to the transmission of the first control signal, the remote control device 200 may be set to control the external device through the first control information according to the first control signal.

Again, returning to FIG. 5, when it is determined that the key test is not necessary, or the key test is finished, the controller 170 may complete the setting of the external device as the control target of the remote control device 200 (S519).

When the setting of the integrated remote controller is completed, the controller 170 may display a screen indicating the completion of the setting of the integrated remote controller on the display 180.

Next, with reference to FIG. 13, a method for the display device 100 to complete the setting of the integrated remote controller according to the voice signal will be described.

FIG. 13 is a view illustrating an example of a state in which the setting of the integrated remote controller is completed depending on the voice signal of the display device according to an embodiment of the present disclosure.

(a) of FIG. 13, when the user utters "Connect to Company D's BDP HDMI2", the controller 170 may extract data that the manufacturer is "Company D", the type of external device is "BDP", and the external input terminal to which the external device is connected is "HDMI2". The controller 170 may compare the extracted data to the necessary data to determine that the extracted data includes all of the data required for setting the integrated remote controller. Also, the controller 170 may determine that the external device is a device that does not require the key test based on the fact that the connected external device is "BDP" of "Company D". In this case, the controller 170 may complete the setting of the integrated remote controller. Also, the controller 170 may control the display 180 to display a screen indicating the completion of the setting of the integrated remote controller as illustrated in (b) of FIG. 13.

As another example, when the user utters "Connect to company A's set-top box HDMI1", the controller 170 may extract data that the manufacturer is "Company A", the type of external device is "set-top box", and the external input terminal to which the external device is connected is "HDMI1". The controller 170 may compare the extracted data to the necessary data to determine that the extracted data includes all of the data required for setting the integrated remote controller. In addition, when it is determined that the connected external device is the device requiring the key test, the controller 170 may complete the key test of the external device and control the display 180 to display the screen indicating the completion of the setting of the integrated remote controller as illustrated in (b) of FIG. 13.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

Each of the embodiments disclosed herein may be practiced alone, or may be practiced in combination with other embodiments.

The scope of protection of the present disclosure should be interpreted by the appending claims, and all technical ideas within the scope of equivalents should be construed as falling within the scope of the present disclosure.

The invention claimed is:

1. A display device comprising:
    a display configured to display content of an external device;
    a user input interface configured to receive a signal from a remote control device; and
    a controller configured to:
    receive a voice signal expressing an intention of setting the external device as a control target of the remote control device;
    extract, from the voice signal, data comprising at least one of a type of the external device, a service provider of the external device, a manufacturer of the external device, or an external input terminal to which the external device is connected;
    determine whether the extracted data comprises all data required for setting the remote control device;
    receive an additional input signal through the user input interface or an additional voice signal to acquire all of the required data among the type of the external device, the service provider of the external device, the manufacturer of the external device and the external input terminal, based on determining that the extracted data does not comprise all of the required data;
    set the external device to be controlled by the remote control device based on the extracted data and the additional input signal; and
    control the external device using the remote control device.

2. The display device according to claim 1, wherein, when receiving a control command of the external device in a state in which the content of the external device that is not set as the control target of the remote control device is being displayed, the controller is further configured to perform an operation for setting the external device as the control target of the remote control device.

3. The display device according to claim 2, wherein, when receiving the control command of the external device in the state in which the content of the external device that is not set as the control target of the remote control device is being displayed, the display is further configured to display a screen that guides the setting of the external device as the control target of the remote control device.

4. The display device according to claim 1, wherein, when receiving the voice signal for setting the external device as the control target of the remote control device, the controller is further configured to:
    acquire a number of external input terminals connected to the external device; and
    receive a selection command of the external input terminal, to which the external device set as the control target of the remote control device is connected, when the external input terminal connected to the external device is provided in plurality.

5. The display device according to claim 1, wherein, when receiving the voice signal for setting the external device as the control target of the remote control device, the controller is further configured to:
- acquire a number of external input terminals connected to the external device;
- recognize the external input terminal, to which the external device is connected, when there is one external input terminal to which the external device is connected; and
- set the external device connected to the recognized external input terminal as the control target of the remote control device.

6. The display device according to claim 1, wherein, when receiving a command for setting the external device connected to the display device as the control target of the remote control device through the voice signal, the controller is further configured to:
- acquire a number of external input terminals connected to the external device; and
- receive a selection command of the external device to be set as the control target of the remote control device when the external device connected to the display device is provided in plurality.

7. The display device according to claim 1, wherein, when the data extracted from the voice signal comprises all data for setting the external device as the control target of the remote control device, the controller is further configured to set the external device connected to the display device as the control target of the remote control device based on the data extracted from the voice signal.

8. The display device according to claim 1, wherein the display is further configured to display types of data required for setting the external device as the control target of the remote control device.

9. The display device according to claim 8, wherein the display is further configured to display data, which is not extracted from the voice signal among the data for setting the external device as the control target of the remote control device, as a type of required data.

10. The display device according to claim 9, wherein the controller is further configured to receive the additional input signal after displaying the type of required data through the display.

11. The display device according to claim 10, wherein the controller is further configured to set the external device as the control target of the remote control device by using the data extracted from the voice signal and data depending on the additional input signal.

12. The display device according to claim 1, wherein the controller is further configured to:
- determine whether the external device requires a key test based on the data extracted from the voice signal;
- when it is determined that the external device connected to the display device requires the key test, output a key test screen through the display;
- execute the key test to install corresponding control information in the remote control device;
- acquire the control information necessary for controlling the external device through the remote control device; and
- allow the user to control the external device using the remote control device based on the control information.

13. The display device according to claim 1, wherein the controller is further configured to:
- acquire audio uttered by the user through a voice acquisition module;
- convert the acquired audio through a STT (speech-to-text) module into text data; and
- analyze the intention to start setting of the remote controller based on the text data through an NLP (natural language processing) module.

* * * * *